US012643776B2

(12) United States Patent
Ascari

(10) Patent No.: US 12,643,776 B2
(45) Date of Patent: Jun. 2, 2026

(54) LIFTING SYSTEM FOR VEHICLES

(71) Applicant: EMANUEL S.r.l., Anzola dell'Emilia (IT)

(72) Inventor: Adelchi Ascari, Anzola dell'Emilia (IT)

(73) Assignee: EMANUEL S.r.l., Anzola dell'Emilia (IT)

(*) Notice: Subject to any disclaimer, the term of this patent is extended or adjusted under 35 U.S.C. 154(b) by 248 days.

(21) Appl. No.: 18/258,583

(22) PCT Filed: Dec. 16, 2021

(86) PCT No.: PCT/IB2021/061853
§ 371 (c)(1),
(2) Date: Jun. 21, 2023

(87) PCT Pub. No.: WO2022/137044
PCT Pub. Date: Jun. 30, 2022

(65) Prior Publication Data

US 2024/0308822 A1 Sep. 19, 2024

(30) Foreign Application Priority Data

Dec. 21, 2020 (IT) ........................ 102020000031649

(51) Int. Cl.
*B66F 7/00* (2006.01)
*B66F 7/06* (2006.01)
*B66F 7/08* (2006.01)

(52) U.S. Cl.
CPC .............. *B66F 7/0691* (2013.01); *B66F 7/08* (2013.01)

(58) Field of Classification Search
CPC .................................. B66F 7/065; B66F 7/00
See application file for complete search history.

(56) References Cited

U.S. PATENT DOCUMENTS 6,059,263 A * 5/2000 Otema ...................... B66F 7/08 254/10 R
6,443,429 B1 * 9/2002 Hawk ................... B66F 7/0625 254/10 R
8,141,851 B2 * 3/2012 Manev .................. B66F 7/0608 254/126

(Continued)

FOREIGN PATENT DOCUMENTS

CN 109 607 411 A 4/2019
EP 1 378 480 A1 1/2004

(Continued)

*Primary Examiner* — Lee D Wilson
(74) *Attorney, Agent, or Firm* — ASLAN LAW, P.C.

(57) ABSTRACT

A lifting system for vehicles comprising at least one lifting platform adapted to support a vehicle; at least one lifting assembly including: one lifting structure, intended to be fastened to one supporting surface and associated rotatable with the lifting platform and including: one pantograph structure associable with the supporting surface; one lifting rod operatively positioned between the pantograph structure and the lifting platform; and linking device/unit/structure/element or the like between the pantograph structure and the lifting rod; one actuator system operatively positioned between the lifting structure and the lifting platform; wherein the lifting structure and the actuator system are associated rotatable with the lifting platform around at least one operational axis.

9 Claims, 6 Drawing Sheets

(56) References Cited

U.S. PATENT DOCUMENTS

| | | | | |
|---|---|---|---|---|
| 9,796,569 | B2 * | 10/2017 | Katerberg | B66F 7/20 |
| 2011/0309316 | A1 * | 12/2011 | Kim | B66F 7/08<br>254/89 H |
| 2012/0048653 | A1 * | 3/2012 | Matthews | B66F 7/08<br>187/211 |
| 2016/0039647 | A1 * | 2/2016 | Katerberg | B66F 7/20<br>254/93 L |
| 2024/0308822 | A1 * | 9/2024 | Ascari | B66F 7/0691 |

FOREIGN PATENT DOCUMENTS

| | | | |
|---|---|---|---|
| JP | H03 85390 | U | 8/1991 |
| WO | WO 2016/180569 | A1 | 11/2016 |

* cited by examiner

LIFTING SYSTEM FOR VEHICLES

CROSS-REFERENCE TO RELATED APPLICATIONS

This application claims priority to IT patent application No. 102020000031649 filed on Dec. 21, 2020, and this application claims priority to and is a 371 of international PCT Application No. PCT/IB2021/061853 filed on Dec. 16, 2021, the entire contents of which are hereby incorporated by reference.

TECHNICAL FIELD

The present invention relates to a lifting system for vehicles.

BACKGROUND ART

Lifting systems are generally used to allow mechanical/maintenance jobs on the underside of the vehicle.

Lifting systems allow the vehicle to be raised off the ground, via its wheels, so that an operator can access the underside thereof.

The lifting systems of known type comprise a pair of lifting platforms adapted to hold the vehicle through its pair of wheels (or more, in the case of larger vehicles, such as trucks or the like).

The known lifting systems also comprise a pair of lifting assemblies, which can be associated with the ground and connected to each of the lifting platforms.

The lifting assemblies are movable between a retracted position, wherein the lifting platform is placed in the proximity of the ground, and an extended position, wherein the lifting platform is raised above the ground to allow the vehicle to be lifted.

In particular, in lifting systems of known type, the lifting assemblies comprise a lifting structure of the "half scissor" type or the like, which supports the lifting platform and an actuator which allows it to be moved.

In the lifting systems of known type, the lifting assemblies are connected to the lifting platform through sliding means, such as e.g. systems consisting of wheels or skids and runways.

Alternatively, the lifting assembly may be connected in a sliding manner to the ground by means of similar sliding means.

The lifting systems of known type do, however, have some drawbacks.

In particular, these drawbacks are mainly linked to the high probability of wear of the aforementioned sliding means. The lifting systems, in fact, are subjected to very high loads and the mutual sliding of the parts, while the vehicle is loaded on the lifting platform, can lead to operational complications, such as, e.g., sliding difficulties, disengagement of the wheels from the runways, and so on.

In addition, the systems of known type do have a high structural complexity which results in laborious assembly operations and consequently longer lead times.

This last drawback is even more evident when the lifting system has runways built in the ground; in this case, in fact, it is necessary to structurally intervene also on the installation site.

In view of these drawbacks, it is clear that the lifting systems for vehicles are in need of further improvement.

DESCRIPTION OF THE INVENTION

The main aim of the present invention is to devise a lifting system for vehicles which allows reducing wear and tear caused by prolonged use and related operational complications.

Another object of the present invention is to devise a lifting system for vehicles which is characterized by greater structural simplicity than known solutions and which allows simple and rapid assembly between the parts and at the installation site.

Another object of the present invention is to devise a lifting system for vehicles which allows the mentioned drawbacks of the prior art to be overcome within a simple, rational, easy and effective to use as well as affordable solution.

The aforementioned objects are achieved by the present lifting system for vehicles having the characteristics of claim 1.

BRIEF DESCRIPTION OF THE DRAWINGS

Other characteristics and advantages of the present invention will become more apparent from the description of a preferred, but not exclusive, embodiment of a lifting system for vehicles, illustrated by way of an indicative, yet non-limiting example, in the accompanying tables of drawings wherein.

EMBODIMENTS OF THE INVENTION

Figure 1:
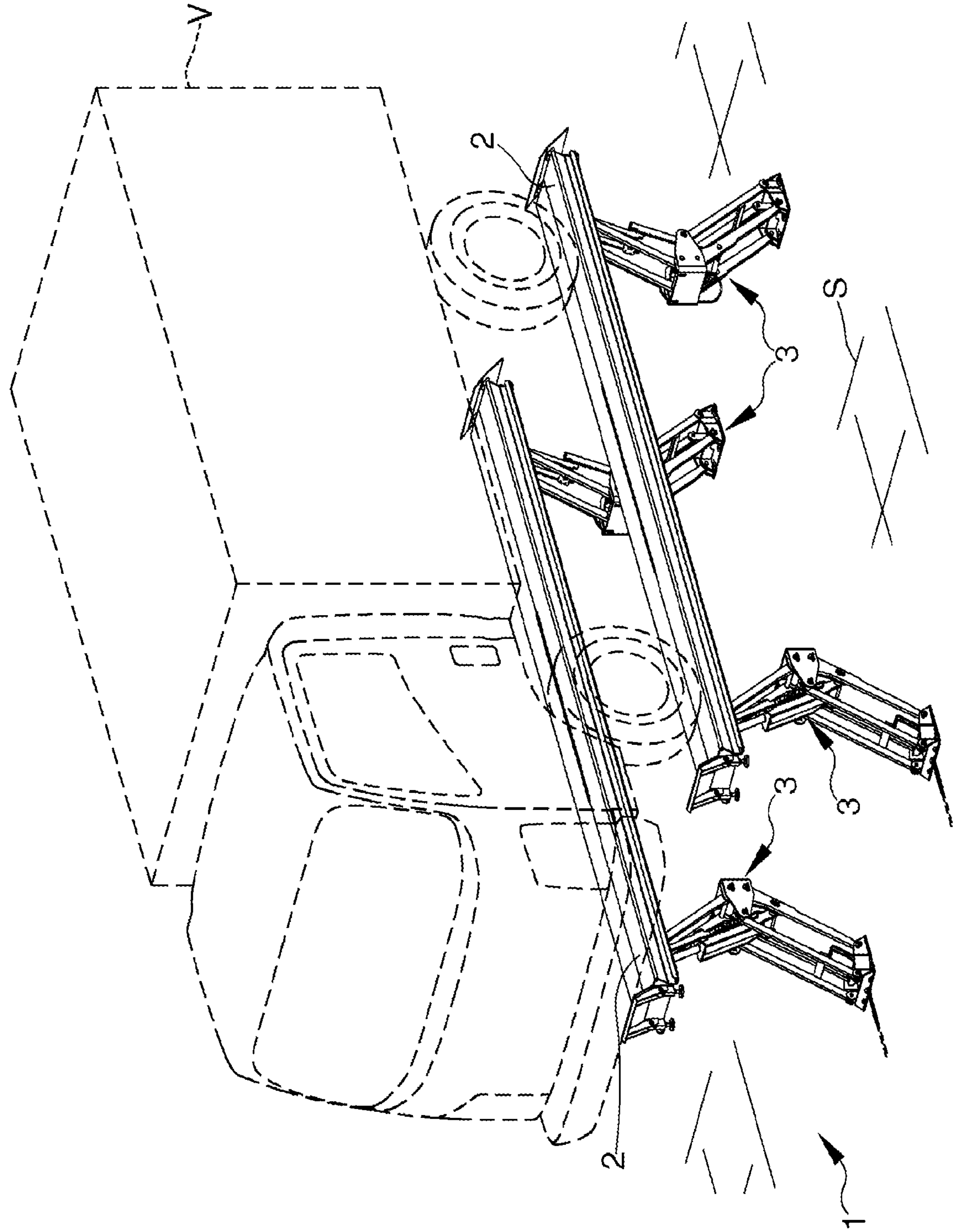
FIG. 1 is an axonometric view of the lifting system for vehicles according to the invention.

With particular reference to such figures, reference numeral 1 globally indicates a lifting system for vehicles.

The lifting system 1 comprises at least one lifting platform 2 adapted to support a vehicle V.

In the context of the present disclosure, "vehicle" means a means of transport provided with at least two sets of wheels arranged parallel to each other with respect to a direction of travel.

For example, in the embodiment shown in FIG. 1, the vehicle V is represented by a truck. It cannot, however, be ruled out that the present lifting system 1 may also be used for different vehicles V, such as passenger cars, buses, rail wagons or the like.

In particular, in the embodiment shown in FIG. 1, the lifting system comprises a pair of lifting platforms 2, each connected to at least one lifting assembly 3, in order to effectively support the vehicle V through the respective wheel sets.

The lifting system 1 is intended to lift the vehicle V with respect to the ground to allow access to the underside by an operator, in order to perform mechanical/maintenance operations to the underside of the vehicle itself.

The lifting system 1 comprises at least one lifting assembly 3 associable with a supporting surface S and associated with the lifting platform 2.

The supporting surface S lies on a substantially horizontal plane. Preferably, the supporting surface S coincides with the ground.

A first embodiment of the present invention is shown in the figures, wherein the lifting system 1 comprises at least two lifting assemblies 3, each arranged at a respective end of the lifting platform 2.

It cannot however be ruled out that, depending on the type of vehicle V and the extension in length of the lifting platforms 2, the lifting system 1 may also comprise more than two lifting assemblies 3 associated with each lifting platform 2.

The two lifting assemblies 3 are substantially similar and arranged symmetrically with respect to a transverse plane passing through the centre of the lifting platform 2.

Each lifting assembly 3 is movable between a retracted position, wherein the lifting platform 2 is arranged in the proximity of the supporting surface S, and an extended position, wherein the lifting platform 2 is raised with respect to the supporting surface S to allow the lifting of the vehicle V.

Substantially, with the lifting assembly 3 in the retracted position, the lifting system 1 allows positioning the vehicle V above the lifting platforms 2 and its moving away at the end of the operations, while with the lifting assembly 3 in the extended position, the vehicle V is positioned at a higher height with respect to the ground to allow access to the underside of the same.

According to the invention, the lifting assembly 3 comprises:

- at least one lifting structure 4, intended to be fastened to the supporting surface S and associated rotatable with the lifting platform 2; and
- at least one actuator system 5 operatively positioned between the lifting structure 4 and the lifting platform 2.

The lifting structure 4 and the actuator system 5 are associated rotatable with the lifting platform 2 around at least one operational axis A1, A2.

Substantially, the lifting structure 4 is connected to the lifting platform 2 at just one point.

Advantageously, the lifting structure 4 is associated rotatable with the lifting platform 2 around a first operational axis A1 and the actuator system 5 is associated rotatable with the lifting platform 2 around a second operational axis A2, separate from the first operational axis A1.

This solution provides greater stability to the lifting assembly 3 and allows better load distribution.

Also according to the invention, the lifting structure 4 comprises:

- at least one pantograph structure 6 associable with the supporting surface S;
- at least one lifting rod 7 operatively positioned between the pantograph structure 6 and the lifting platform 2; and
- linking means 8 between the pantograph structure 6 and the lifting rod 7.

The term "pantograph structure" means a structure formed by a plurality of elements hinged together to define a deformable parallelogram.

More in detail, as shown in the figures, the lifting structure 4 comprises a pair of pantograph structures 6 and a pair of lifting rods 7 arranged symmetrically to each other with respect to a longitudinal plane.

This embodiment allows the lifting assembly 3 to adapt to the width of the lifting platform 2 and to support the latter very effectively.

The special geometrical conformation of the lifting structure 4 allows a rotatable connection between the lifting assembly 3 and the lifting platform 2, thus avoiding the use of sliding connections between the parts.

Each of the pantograph structures 6 comprises:

- at least one basic element 9 configured to be fastened to the supporting surface S; and
- at least one pair of supporting rods 10, 11, wherein each of the supporting rods 10, 11 is provided with one end associated with the basic element 9 and with an opposite end associated with the linking means 8.

Figure 2:
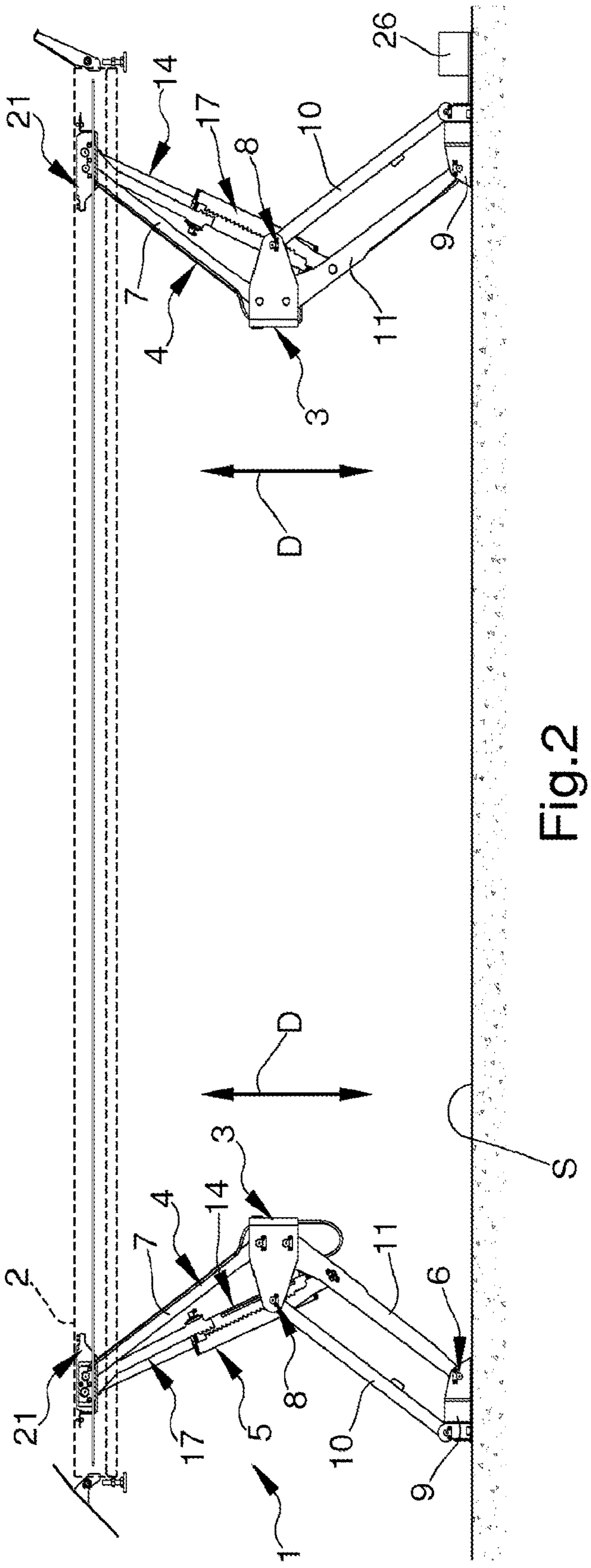
FIGS. 2 and 3 are side views of the lifting system according to the invention, in two different positions of use.
Figure 3:
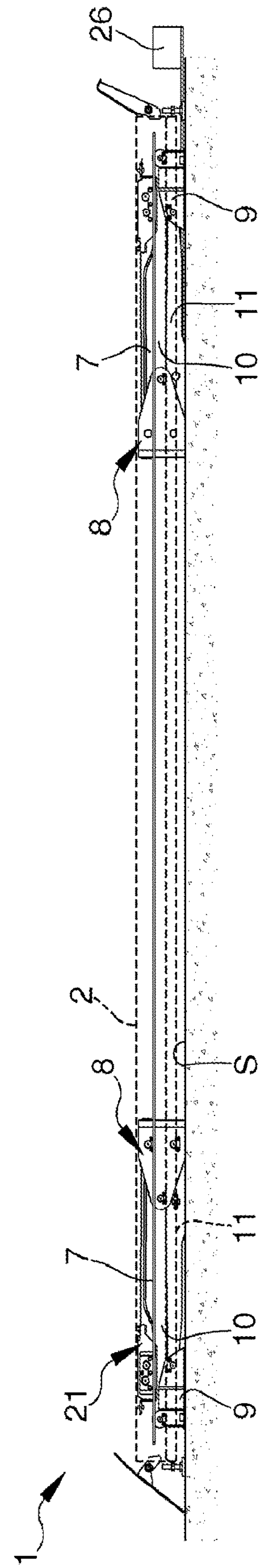
Figure 4:
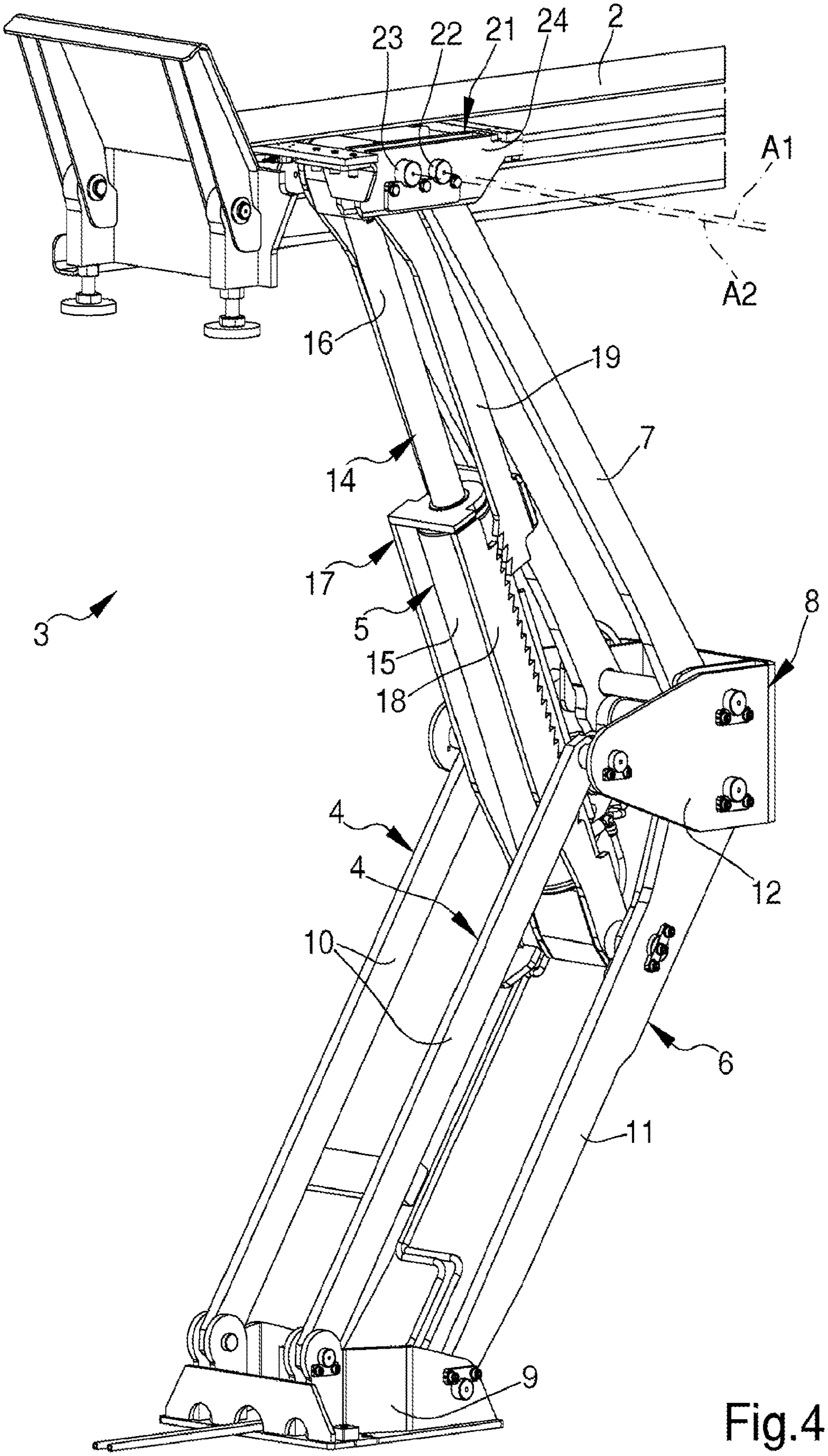
FIG. 4 is an axonometric view of a lifting assembly of the lifting system according to the invention.

As shown in FIGS. 2 and 3, the supporting rods 10, 11 are substantially parallel to each other between the extended position and the retracted position.

In other words, the supporting rods 10, 11 are always equidistant, at any point, at whatever height the lifting assembly 3 is intended to be positioned.

As explained above, this contributes to the high stability of the lifting structure 4 and avoids the use of sliding elements between the parts.

Moreover, the pantograph structure 6, in the retracted position, gives great compactness to the lifting assembly 3. The supporting rods 10, 11, in fact, are substantially overlapped in such position and this allows the lifting platform 2 to move considerably close to the supporting surface S, thus facilitating the positioning of the vehicle V.

In particular, the pair of supporting rods 10, 11 comprises a first rod 10 and a second rod 11.

Advantageously, the linking means 8 comprise:

- at least one connecting element 12 adapted to connect at least the first rod 10 to a respective lifting rod 7; and
- at least one connecting rod element 13 adapted to connect at least the second rod 11 to the lifting rod 7.

In more detail, the first rod 10 is associated rotatable with the connecting element 12 around a substantially horizontal first hinging axis R1.

The lifting rod 7 is associated rotatable with the connecting element 12 around a second hinging axis R2, separate from the first hinging axis R1 and substantially parallel thereto.

Figure 5:
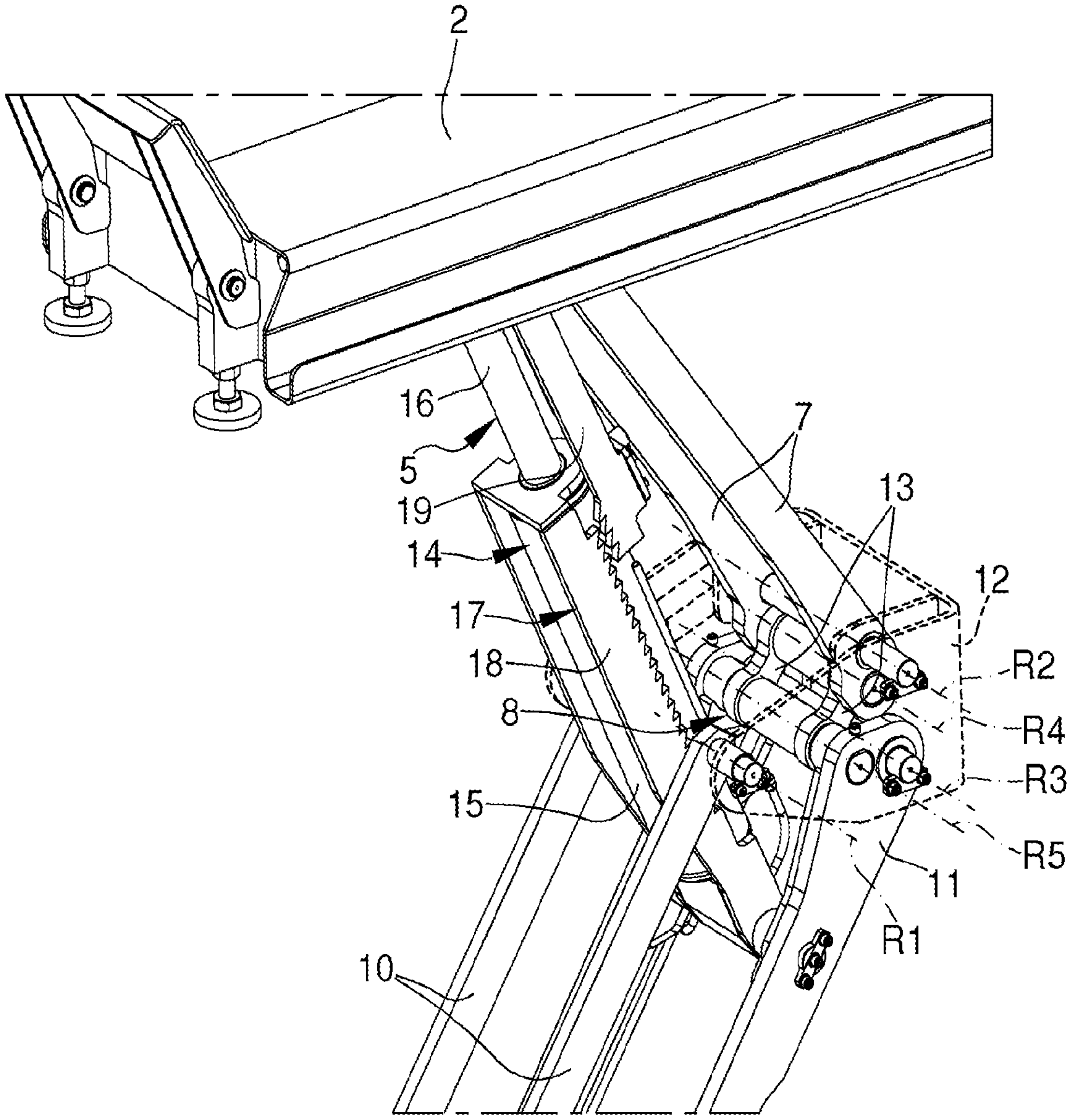
FIG. 5 is an axonometric detailed view of a lifting assembly of the lifting system according to the invention.

As shown in FIG. 5, the connecting element 12 is, also, adapted to connect the first rod 10 to the second rod 11 and to keep them parallel during the movement of the lifting assembly 3.

Specifically, the second rod 11 is associated rotatable with the connecting element 12 around a third hinging axis R3.

The second hinging axis R2 and the third hinging axis R3 are substantially parallel to each other and lie in the same substantially vertical plane.

The connecting rod element 13 has the function of connecting the ends of the lifting rod 7 to the second rod 11 and allowing them to mutually rotate and shift.

In particular, the lifting rod 7 is connected to the connecting rod element 13 around a fourth hinging axis R4, which is substantially horizontal and parallel to the second hinging axis R2.

The second rod 11 is connected to the connecting rod element 13 around a fifth hinging axis R5.

The arrangement of the hinging axes R1-R5 allows vertical movement of the lifting assembly 3 and optimum load distribution.

Basically, as also shown in FIGS. 2 and 3, between the retracted position and the extended position, the lifting assembly 3 extends along a substantially vertical direction D.

Furthermore, in the retracted position, the connecting rod element 13 allows the lifting rod 7 to overlap the supporting rods 10, 11 and contributes to giving compactness to the lifting assembly 3.

The lifting structure 4 is moved thanks to the actuator system 5.

Conveniently, the actuator system 5 comprises at least one actuator device 14 operatively positioned between the second rod 11 and the lifting platform 2.

In the embodiment shown in the figures, the actuator device 14 is, e.g., of the type of a hydraulic cylinder.

It cannot however be ruled out that the actuator device 14 is of a different type. The actuator device 14 comprises a fixed portion 15 and a movable portion 16. The fixed portion 15 is associated rotatable with the second rod 11 at the connecting element 12.

The movable portion 16, on the other hand, is associated rotatable with the lifting platform 2.

In more detail, the movable portion 16 is associated rotatable with the lifting platform 2 at the second operational axis A2.

Advantageously, the actuator system 5 comprises at least one safety device 17 associated with the actuator device 14 and operable to stop the movement of the lifting assembly 3 towards the retracted position.

As shown in the figures, the safety device 17 comprises a pair of toothed rods 18, 19 mutually engaging via a ratchet mechanism.

The ratchet mechanism is familiar to the technician in the field and allows movement in just one direction while preventing it in the opposite direction.

In other words, the toothed rods 18, 19 are made to allow the movement of the lifting structure 4 from the retracted position towards the extended position, but they prevent the opposite movement thereof.

In particular, the toothed rods 18, 19 comprise a lower rod 18 associated with the fixed portion 15 and an upper rod 19 associated with the movable portion 16.

In more detail, the upper rod 19 is associated rotatable with the movable portion 16 around the second operational axis A2.

During the movement towards the extended position, the upper rod 19 may shift on the lower rod 18, thus remaining engaged therewith.

The safety device 17 also comprises a release element 20 associated with the toothed rods 18, 19.

The release element 20 is associated with the upper rod 19 at the fixed portion 15 of the actuator device 14.

Conveniently, the release element 20 is operable to partly rotate the upper rod 19, disengaging it from the lower rod 18 and allowing the movement of the lifting structure 4 towards the retracted position.

The release element 20 is of the type, e.g., of a pin operable by means of compressed air.

Figure 6:
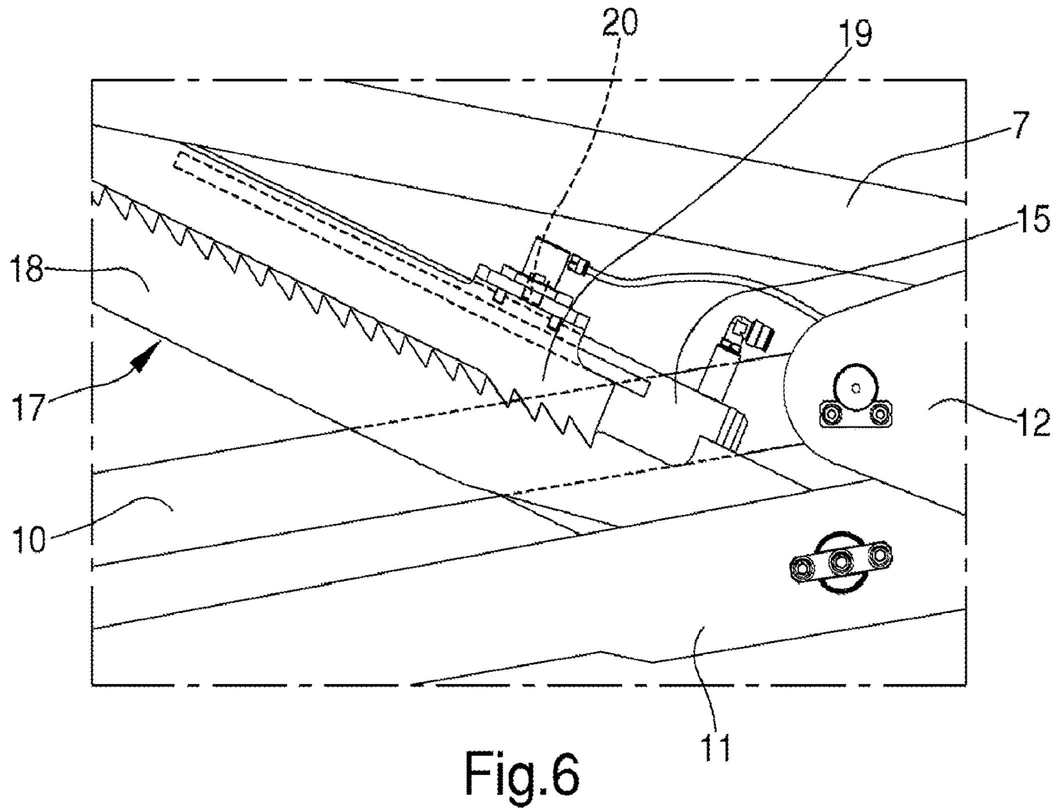
FIGS. 6 and 7 are detailed side views of a lifting assembly of the lifting system according to the invention, in two different configurations of usage.
Figure 7:
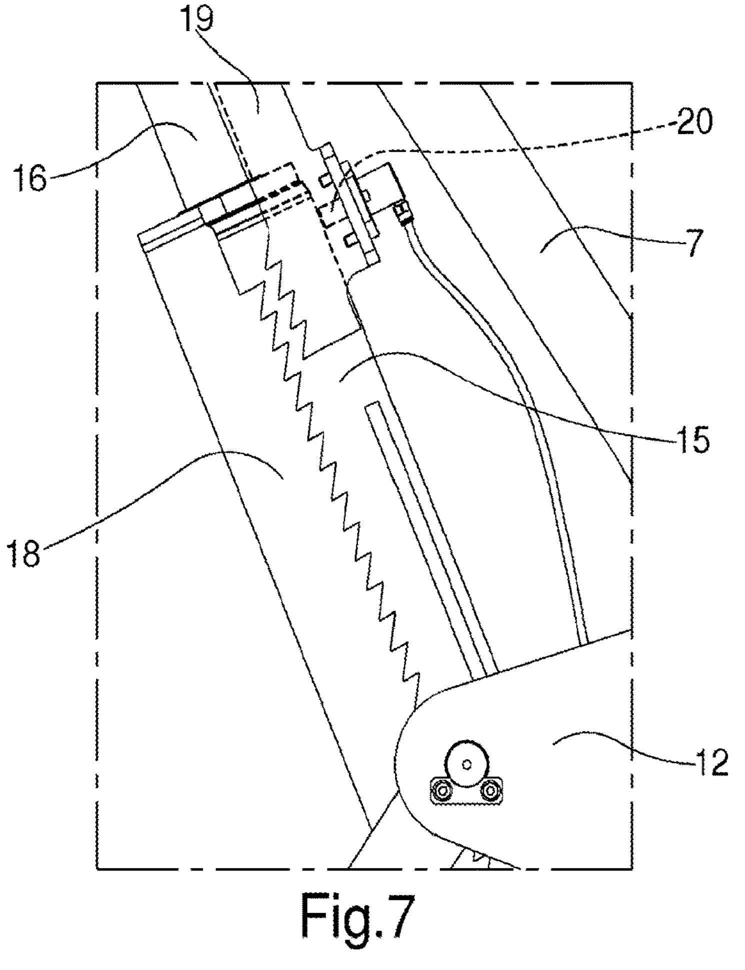
Figure 8:
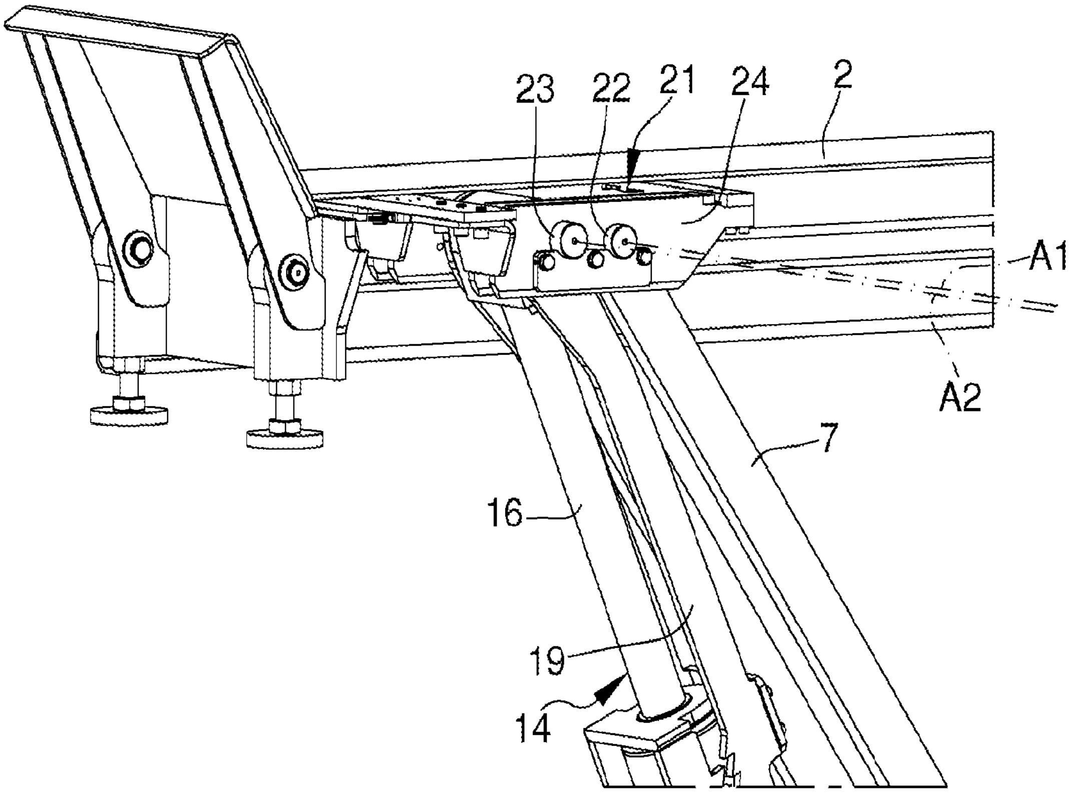
FIGS. 8 and 9 are axonometric detailed views of a lifting assembly of the lifting system according to the invention.

In more detail, as shown in FIGS. 6 and 7, when the release element 20 is actuated, it abuts against the actuator device 14 and, by levering thereon, makes the upper rod 19 rotate.

Advantageously, the lifting system 1 comprises a connecting unit 21 positioned between the lifting platform 2 and the lifting assembly 3.

The connecting unit 21 comprises:

- at least a first pivot 22 extending along the first operational axis A1 and adapted to support the lifting structure 4 in rotation; and
- at least a second pivot 23 extending along the second operational axis A2 and adapted to support the actuator system 5 in rotation;
- wherein the first pivot 22 and the second pivot 23 are substantially parallel to each other.

The second pivot 23 also supports the upper rod 19 of the safety device 17.

The connecting unit 21 also comprises a housing element 24 of the pivots 22, 23, associable with the lifting platform 2 by means of removable assembly means, such as, e.g., screws or the like.

The removable assembly means allow for a simple and quick installation of the lifting system 1. This also allows facilitating the transport and delivery operations to the customer. The lifting system 1 can, in fact, be delivered to the customer with the lifting assembly 3 already assembled, i.e. with all components correctly connected to each other, and can simply be bolted to the lifting platform 2 when it is at the installation site.

In the embodiment shown in the figures, at least one of the connecting units 21 comprises at least one compensation element 25 supporting the pivots 22, 23 and adapted to compensate a deformation of the lifting platform 2 during use.

In particular, during use, any deformation of the lifting platform 2 leads to a bending of the platform itself and to a mutual approach of the ends thereof. This deformation, even if minimal, could excessively stress the lifting assemblies 3 and lead to damages of the entire lifting system 1.

Thus, the compensation element 25 allows the deformation of the lifting platform 2 without affecting the lifting assemblies 3.

Figure 9:
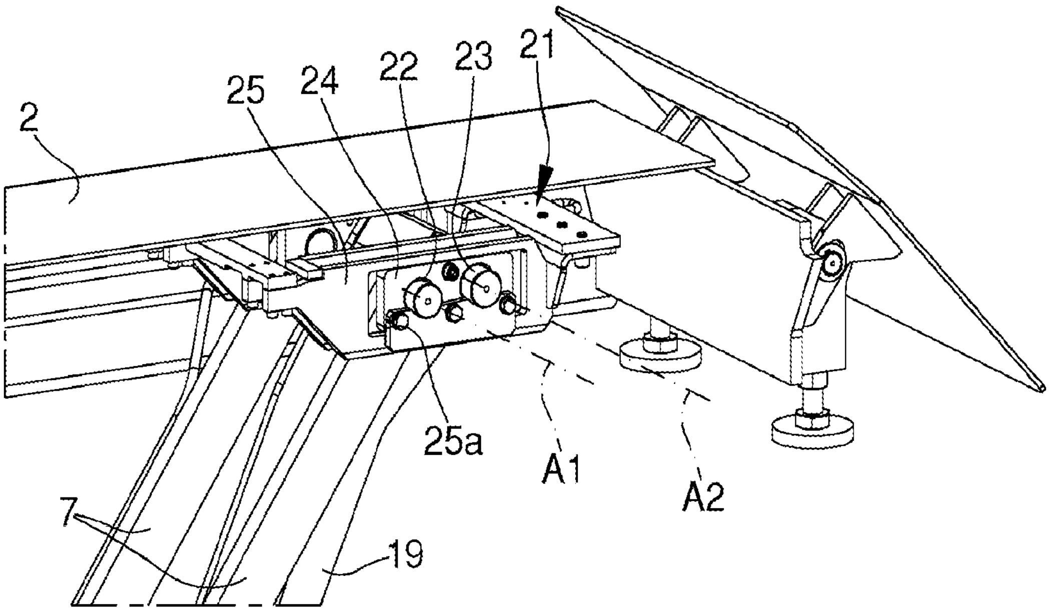

In detail, as shown in FIG. 9, the compensation element 25 defines a slot **25*a* inside which the housing element 24** is arranged and which allows a substantially horizontal shift movement thereof.

Again with reference to the embodiment shown in the figures, the lifting system 1 also comprises at least one operating device 26 operatively connected to each of the actuator systems 5 and adapted to allow a synchronous movement of the lifting assemblies 3.

The operating device 26, e.g. of the compressed air type, can also be connected to the respective safety devices 17, so that the release elements 20 are operated synchronously.

It cannot however be ruled out that the lifting system 1 comprises a separate operating device 26 for each lifting assembly 3.

The operation of the present lifting system 1 is as follows.

With the lifting assemblies 3 in the retracted position, the lifting platforms 2 are moved close to the supporting surface S to allow the vehicle V to be loaded thereon.

By means of the operating device 26, the lifting assemblies 3 are moved to the extended position.

During such movement, the lifting structure 4 extends along the direction D, substantially vertically. The upper rod 19 of the safety device 17 slides on the lower rod 18 and, after the desired height has been reached, blocks the movement of the lifting assembly 3 back to the retracted position.

After the operations on the vehicle V have been completed, the lifting platforms 2 are moved back towards the supporting surface S to allow the vehicle itself to be moved away.

For this purpose, the release element 20 is operated and the actuator device 14 moves the lifting assemblies 3 back to the retracted position.

In a second embodiment, not shown in detail in the figures, the lifting system 1 comprises just one lifting assembly 3 associated with each of the lifting platforms 2.

In particular, this embodiment envisages that the lifting assembly 3 is associated with the lifting platform 2 substantially at the centre of the latter.

The lifting assembly 3, according to the present embodiment, differs from what described above by the fact that the lifting structure 4 also comprises at least one sustaining rod, operatively positioned between the pantograph structure 6 and the lifting platform 2.

The sustaining rod is associated rotatable with the lifting platform 2 around a third operational axis, separate from the first operational axis A1. Furthermore, the sustaining rod and the lifting rod 7 are substantially parallel to each other between the extended position and the retracted position.

In other words, in this second embodiment, the lifting assembly comprises a double pantograph structure which allows, therefore, the lifting platform 2 to be moved by means of just one lifting assembly 3.

It has, in practice, been ascertained that the described invention achieves the intended objects and, in particular, the fact has been emphasized that the special geometric conformation of the lifting structure allows the present lifting system for vehicles to be extremely resistant and less subject to wear phenomena than known solutions.

In addition, the present lifting system is characterized by greater structural simplicity than known solutions and allows for simple and quick assembly between the parts and at the installation site.

The invention claimed is:

1. A lifting system for vehicles, said lifting system comprising:

at least one lifting platform adapted to support a vehicle;

at least one lifting assembly associable with a supporting surface and associated with said lifting platform, movable between a retracted position, wherein said lifting platform is arranged in the proximity of said supporting surface, and an extended position, wherein said lifting platform is raised with respect to said supporting surface to allow the lifting of said vehicle, wherein said lifting assembly comprises:

at least one lifting structure, intended to be fastened to said supporting surface and associated rotatable with said lifting platform and comprising:

at least one pantograph structure associable with said supporting surface;

at least one lifting rod operatively positioned between said pantograph structure and said lifting platform;

linking means between said pantograph structure and said lifting rod; and at least one actuator system operatively positioned between said lifting structure and said lifting platform; and a connecting unit positioned between said lifting platform and said lifting assembly and comprising: at least a first pivot extending along a first operational axis and adapted to support said lifting structure in rotation; and at least a second pivot extending along a second operational axis, separate from said first operational axis, and adapted to support said actuator system in rotation, wherein said lifting structure and said actuator system are associated rotatable with said lifting platform via said first pivot and said second pivot, respectively.

2. The lifting system according to claim 1, wherein said pantograph structure comprises:

at least one basic element configured to be fastened to said supporting surface; and at least one pair of supporting rods, wherein each of said supporting rods is provided with one end associated with said basic element and with an opposite end associated with said linking means (8), and wherein said supporting rods being substantially parallel to each other between said extended position and said retracted position.

3. The lifting system according to claim 2, wherein said pair of supporting rods comprises a first rod and a second rod and said linking means comprise:

at least one connecting element adapted to connect to each other at least said first rod to said lifting rod; and at least one connecting rod element adapted to connect to each other at least said second rod to said lifting rod.

4. The lifting system according to claim 1, wherein said actuator system comprises at least one actuator device operatively positioned between said second rod and said lifting platform, said actuator device being rotatable around said second operational axis.

5. The lifting system according to claim 4, wherein said actuator system comprises at least one safety device associated with said actuator device, operable to stop the movement of said lifting assembly towards said retracted position.

6. The lifting system according to claim 1, further comprising: at least two of said lifting assemblies, each arranged at a respective end of said lifting platform.

7. The lifting system according to claim 6, wherein at least one of said connecting units comprises at least one compensation element supporting said pivots and adapted to compensate a deformation of said lifting platform during use.

8. The lifting system according to claim 7, further comprising: at least one operating device operatively connected to each of said actuator systems so as to allow a synchronous movement of said lifting assemblies.

9. The lifting system according to claim 1, wherein said lifting structure comprises at least one sustaining rod, operatively positioned between said pantograph structure and said lifting platform, wherein said sustaining rod is associated rotatable with said lifting platform about a third operational axis, separate from said first operational axis, said sustaining rod and said lifting rod being substantially parallel to each other between said extended position and said retracted position.

* * * * *